United States Patent
Thomas (10) Patent No.: US 11,321,345 B2
(45) Date of Patent: May 3, 2022

(54) SYSTEMS AND METHODS OF PROVIDING GRAPHICAL RELATIONSHIPS OF DISPARATE DATA OBJECT FORMATS

(71) Applicant: Rightcrowd Software Pty Ltd., Varsity Lakes (AU)

(72) Inventor: David Thomas, Queensland (AU)

(73) Assignee: RIGHTCROWD SOFTWARE PTY LTD., Queensland (AU)

( * ) Notice: Subject to any disclaimer, the term of this patent is extended or adjusted under 35 U.S.C. 154(b) by 151 days.

(21) Appl. No.: 16/365,311

(22) Filed: Mar. 26, 2019

(65) Prior Publication Data

US 2019/0303383 A1 Oct. 3, 2019

Related U.S. Application Data

(60) Provisional application No. 62/650,490, filed on Mar. 30, 2018.

(51) Int. Cl.
*G06F 16/30* (2019.01)
*G06F 16/25* (2019.01)
*G06F 16/901* (2019.01)
*G06F 16/904* (2019.01)
*G06F 16/2455* (2019.01)

(52) U.S. Cl.
CPC ...... *G06F 16/258* (2019.01); *G06F 16/24568* (2019.01); *G06F 16/904* (2019.01); *G06F 16/9024* (2019.01)

(58) Field of Classification Search
CPC . G06F 16/258; G06F 16/24568; G06F 16/904
USPC ............ 707/609, 687, 705, 769, 813, 821
See application file for complete search history.

(56) References Cited

U.S. PATENT DOCUMENTS

| | | | | |
|---|---|---|---|---|
| 5,911,776 | A | * | 6/1999 | Guck ............... G06F 16/258 709/217 |
| 6,032,147 | A | * | 2/2000 | Williams ........... G06F 16/258 |
| 7,212,574 | B2 | * | 5/2007 | Abrams, Jr. ......... H04L 69/40 375/240.26 |
| 2003/0131007 | A1 | | 7/2003 | Schirmer et al. |
| 2007/0214063 | A1 | | 9/2007 | Kahlon et al. |
| 2008/0008458 | A1 | * | 1/2008 | Gudipaty ............ H04N 7/147 348/E7.083 |

(Continued)

OTHER PUBLICATIONS

PCT/US2019/024101, "International Search Report and Written Opinion", dated Jun. 13, 2019, 11 pages.

(Continued)

*Primary Examiner* — Sana A Al-Hashemi
(74) *Attorney, Agent, or Firm* — Kilpatrick Townsend & Stockton LLP (57) ABSTRACT

Methods and systems are disclosed for generating common objects in a universal format. A stream of data objects is received from each of a plurality of databases. Each stream of data objects includes objects represented in a disparate data type from objects in other streams. A plurality of agents are generated and configured to process data objects of a particular format. For each object, a source database of the data object is identified. An agent of the plurality of agents can be selected based on a database type of the source database. The agent generates a common object from the data object that is represented in a universal format. The common object is stored a graph database of common objects.

20 Claims, 7 Drawing Sheets

(56) References Cited

U.S. PATENT DOCUMENTS

| | | | |
|---|---|---|---|
| 2008/0222201 A1 | 9/2008 | Chen et al. | |
| 2009/0150431 A1 | 6/2009 | Schmidt et al. | |
| 2010/0287141 A1* | 11/2010 | Prahlad | G06F 3/0607 707/645 |
| 2011/0050728 A1* | 3/2011 | Williamson | G06Q 10/10 345/649 |
| 2011/0113011 A1* | 5/2011 | Prorock | G11B 27/36 707/634 |
| 2012/0197816 A1* | 8/2012 | Short | G06Q 30/0282 705/347 |

OTHER PUBLICATIONS

Yegulalp, "What is a Graph Database? A Better Way to Store Connected Data", Available Online at, <https://www.infoworld.com/article/3263764/what-is-a-graph-database-a-better-way-to-store-connected-data.html>, 2018.
PCT/US2019/024101, "International Preliminary Report on Patentability", dated Oct. 15, 2020, 10 pages.

* cited by examiner

SYSTEMS AND METHODS OF PROVIDING GRAPHICAL RELATIONSHIPS OF DISPARATE DATA OBJECT FORMATS

CROSS-REFERENCES TO RELATED APPLICATIONS

This application claims the benefit of and the priority to U.S. Provisional Patent Application No. 62/650,490 filed on Mar. 30, 2018, entitled "SYSTEMS AND METHODS OF PROVIDING GRAPHICAL RELATIONSHIPS OF DISPARATE DATA OBJECT FORMATS," which is hereby incorporated by reference in its entirety for all purposes.

BACKGROUND OF THE INVENTION

Large software systems typically use a combination of custom hardware and software and commercial off-the-shelf (COTS) hardware and software products. For example, a large company may use a human resources (HR) system such as PeopleSoft but design a custom physical security system. As logical systems expand, the software and hardware needs change causing many logical systems to begin developing or acquiring new platforms to satisfy those needs. This increases the complexity of the overall system and requires increased effort and vigilance by the organization to ensure users have appropriate levels of access. In many cases, as users change roles within an organization and as users leave the organization, it becomes difficult to identify instances of inappropriate access due to the complexity and low levels of security integration between corporate systems.

Even when organizations implement stringent security protocols and processes around the management of user access, issues of inappropriate user access will arise, often with disastrous results. While manual intervention and audits can assist in solving the problem, the complexity and time consumption in manually delivering a single system audit is so high that organizations either audit infrequently, or in some cases, not at all. This generally is due to the volume of security data that resides on disconnected systems and stored in incompatible data formats. For example, data regarding users within an organization is stored in a different format from security data stored in an application. As systems grow, adding more and more applications and products, there is a proportional increase in the number of unique and distinct ways the data may be stored.

In most cases, analyzing security information across multiple platforms requires unique and custom methods of data extraction and analysis that must be defined for each system individually. Once extracted, those various collections of data need to be cross referenced into a single view of access across the organization to, for example, confirm that user access is appropriate. This error-prone process is rarely able to identify or control risks to the system. Without understanding the relationship between objects in the source platform or destination platform, it is not apparent how an object in the source platform may affect an object in the destination platform. In addition, due to the time delay in both generating the report and processing the report, any fault in an object from the source platform that may affect a corresponding object in the destination platform may be exploited before it can be identified or mitigated. Thus, large software systems of disparate platforms are inefficiently controlled, prone to system wide faults, and are insecure or otherwise vulnerable to security breaches.

SUMMARY OF THE INVENTION

The methods and systems provided alleviate the shortcomings of the art by providing methods and systems for loading objects from a plurality of source databases that are represented in disparate formats and transforming the objects into common objects in a universal format. Relationships between common objects may be captured and represented with a graph database that can represent a cross-platform, interconnected view of the data in each of the plurality of source databases. Thus, large interconnected systems of disparate platforms can transfer data (e.g., security and other types of data) for centralized analysis efficiently, safely, and without the latency induced by manual processes, interpretations, or interfaces. In addition, the representation of common objects within a graph database identifies relationships (e.g., security, dependencies and the like) between objects for the identification and mitigation of security vulnerabilities.

Thus, embodiments of the present disclosure provide methods of generating common objects in a universal format. The methods include receiving a stream of data objects from each of a plurality of source systems, wherein at least one system of the plurality of source systems stores data objects in a different format than other source systems of the plurality of source systems; generating a plurality of agents, each agent of the plurality of agents configured to process data objects that are received from a source system that conforms to a particular system type; for each data object of the stream of data objects from each of the plurality of source systems: detecting a particular source system of the plurality of source systems that corresponds to the data object, the particular source system storing data objects according a particular format based on a system type of the particular source system; selecting a particular agent of the plurality of agents based on the system type of the particular source system, the particular agent configured to process data objects represented in the particular format of the particular source system of the data object; generating, by the particular agent, a common object from the data object, the common object represented in a universal format; and storing the common object in a graph system.

Embodiments of the present disclosure provide other methods of generating common objects in a universal format. Those methods include receiving a stream of data objects in disparate formats from each of a plurality of source databases. The method continues by generating a plurality of agents, each agent configured to process data objects of a particular format. For each of the plurality of agents, the method detects a source database of the data object, selects an agent of the plurality of agents based on the database type of the source database, generates a common object from the data object represented in a universal format, and stores the common object in a graph database.

Embodiments of the present disclosure provide systems of generating common objects in a universal format. The systems include one or more processors; and a non-transitory computer-readable storage media that includes instructions that when executed by the one or more processors cause the one or more processors to perform operations including: receiving a stream of data objects from each of a plurality of source systems, wherein at least one system of the plurality of source systems stores data objects in a different format than other source systems of the plurality of source systems; generating a plurality of agents, each agent of the plurality of agents configured to process data objects that are received from a source system that conforms to a particular system type; for each data object of the stream of data objects from each of the plurality of source systems: detecting a particular source system of the plurality of source systems that corresponds to the data object, the particular source system storing data objects according a particular format based on a system type of the particular source system; selecting a particular agent of the plurality of agents based on the system type of the particular source system, the particular agent configured to process data objects represented in the particular format of the particular source system of the data object; generating, by the particular agent, a common object from the data object, the common object represented in a universal format; and storing the common object in a graph system.

Embodiments of the present disclosure provide other systems of generating common objects in a universal format. Those systems includes receiving a stream of data objects in disparate formats from each of a plurality of source databases. The system continues by generating a plurality of agents, each agent configured to process data objects of a particular format. For each of the plurality of agents, the system detects a source database of the data object, selects an agent of the plurality of agents based on the database type of the source database, generates a common object from the data object represented in a universal format, and stores the common object in a graph database.

Embodiments of the present disclosure also provide a non-transitory computer-readable medium that includes instructions that when executed by one or more processors cause the one or more processors to perform operations including: receiving a stream of data objects from each of a plurality of source systems, wherein at least one system of the plurality of source systems stores data objects in a different format than other source systems of the plurality of source systems; generating a plurality of agents, each agent of the plurality of agents configured to process data objects that are received from a source system that conforms to a particular system type; for each data object of the stream of data objects from each of the plurality of source systems: detecting a particular source system of the plurality of source systems that corresponds to the data object, the particular source system storing data objects according a particular format based on a system type of the particular source system; selecting a particular agent of the plurality of agents based on the system type of the particular source system, the particular agent configured to process data objects represented in the particular format of the particular source system of the data object; generating, by the particular agent, a common object from the data object, the common object represented in a universal format; and storing the common object in a graph system.

Embodiments of the present disclosure also provide a non-transitory computer-readable medium that includes instructions that when executed cause a processor perform operations for generating common objects in a universal format. The operations include instructions that cause operations including receiving a stream of data objects in disparate formats from each of a plurality of source databases. The operations continue by generating a plurality of agents, each agent configured to process data objects of a particular format. For each of the plurality of agents, the operations detect a source database of the data object, select an agent from the plurality of agents based on the database type of the source database, generate a common object from the data object represented in a universal format, and store the common object in a graph database.

Numerous benefits are achieved by way of the present invention over conventional techniques. For example, embodiments of the present invention present objects represented in disparate formats in a universal format thereby enabling relationships to be defined for objects received from databases with incompatible formats. In addition, system wide security may be enforced by identifying security permissions granted to related but disparate objects and by identifying the various paths of interconnected security objects that facilitate access to the disparate objects. These and other embodiments of the invention along with many of its advantages and features are described in more detail in conjunction with the text below and attached figures.

Further areas of applicability of the present disclosure will become apparent from the detailed description provided hereinafter. It should be understood that the detailed description and specific examples, while indicating various embodiments, are intended for purposes of illustration only and are not intended to necessarily limit the scope of the disclosure.

BRIEF DESCRIPTION OF THE DRAWINGS

The present disclosure is described in conjunction with the appended figures.

In the appended figures, similar components and/or features may have the same reference label. Where the reference label is used in the specification, the description is applicable to any one of the similar components having the same reference label.

DETAILED DESCRIPTION OF SPECIFIC EMBODIMENTS

The ensuing description provides preferred exemplary embodiments only, and is not intended to limit the scope, applicability or configuration of the disclosure. Rather, the ensuing description of the preferred exemplary embodiments will provide those skilled in the art with an enabling description for implementing a preferred exemplary embodiment. It is understood that various changes may be made in the function and arrangement of elements without departing from the spirit and scope as set forth in the appended claims.

Specific details are given in the following description to provide a thorough understanding of the embodiments.

However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Embodiments of the present disclosure provide methods and systems for representing disparate objects in a universal format. In many instances, large systems employ software and hardware platforms of a variety of formats. As systems grow and the needs change, new hardware and software-based solutions demand a combination of custom and off-the-shelf products. Although these products offer different solutions for the larger system, in many instances the products lack interoperability with many of the other such systems deployed by the system. For example, objects stored in a relational database, an object database, and a NoSQL database use different formats that are largely incompatible with each other. Thus, an object from one system cannot be loaded or read by an object of another system even though both objects may be related (e.g., such as through a common association with a same user). Thus, the present methods and systems alleviate this and other shortcomings of the art by providing a graph database that stores objects in a universal format.

Objects of one or more third-party systems may be loaded by an agent of a security analytics system. In some examples, the object is loaded from a database of the third-party system, yet the systems and methods described herein are not limited to databases. Thus, as used herein, the term database refers to databases as well as to any data structure, storage device (e.g., temporary, physical, or virtual), file (e.g., documents, spreadsheets, text, or the like), or any other mechanism for storing data in any format that can be read by a computing device. In some examples, the security analytics system includes a plurality of agents, one for each system format compatible with the security analytics system. In those examples, the security analytics system identifies a particular agent that is compatible with a particular database type and uses that agent to load objects from that particular database. The agent may then disassemble the objects into raw data and generate a common object using the raw data. In some examples, the agent need not disassemble the object but instead transforms the object intact into a new common object. Regardless of the particular agent used to generate the common objects or the database from which the objects originated, all common objects are represented in a universal format. The universal format enables security analytics subsystems to load, store, manipulate, represent, and/or transfer any of the common objects.

In some examples, the security analytics system may load objects from one or more of: development systems, HR systems, physical security systems, software security systems, databases, servers, and the like. In some examples, a physical security system controls access to a portion of a building. For example, a physical security system may use one or more of keycard, biometrics (fingerprint, retina, or the like), password, or the like to grant a user access to a door, garage, gate, locker, room, secured area, or the like. The physical security system may include data that provides an association between a user and the particular physical security permissions that user has been granted. In some examples, the physical security objects may include attributes including authorization to enter (e.g., granting a user access to the physical space), certification to open (e.g., credentials such as keycard, password, biometrics, or the like) necessary to authorize access, authorization to approve access (e.g., which users or objects have authorization to grant access to the physical space), and the like. In some examples, software security systems control access to one or more hardware or software platforms connected to the security analytics system. In some examples, every object loaded by the security analytics system has an associated security permission associated therewith that may grant a user access to any logical or physical system that is able to be represented by a security permission.

Once the agents load the common objects, a loader may process data from the agent and convert the data to a graph database compliant format suitable for the graph database. The loader may then load and merge security data into the graph database based on an abstract modeling structure. Once the loader completes processing the objects, the objects are stored in the abstract data model within the graph database. The loader may identify objects from each system to define and represent the relationship of each object across each system. Once stored, the relationships may be queried by the security analytics system or a user to access particular aspects of the objects, related objects, or the relationships of stored objects.

The graph database may provide a representation of the relationships between objects loaded by the security analytics system. For example, a physical security object that grants a user access to door of a server room may be associated with a software security object that grants the same user access to the server. In some examples, objects may be related based on a common user, common physical or software security access, ownership (e.g., employee/manager), data value, or any other common association between objects. In some examples, some objects may have a limited association such that the objects may be limited to a one-to-one relationship such as a particular security access permission that may be associated with only one user. In some examples, some objects may have a one-to-many relationship such as a manager object that manages multiple employee objects in an HR system. In some examples, objects may be related in a many-to-many relationship such as objects in a database may be related with other objects of a particular environment or subsystem of the security analytics system.

Common objects within the graph database may be represented in a graphical user interface that displays a one, two, three, or higher-dimensional representation of the objects and relationships stored by the graph database. In some examples, the objects may be represented as a directed graph in which each object is connected by an edge to zero or more other objects. In those examples, a higher-dimensional representation may be one in which an edge may be bound to zero or more other edges. For example, a relationship connecting two objects may be itself bound to other relationships, in addition to connecting the two objects. Thus, a user corresponding to a first object may have access to a second object, only when the user is physically located within a specific location. If the user is located outside the specific location the access permission to the second object may be revoked (either temporarily or permanently).

In some examples, the relationships and display may identify security vulnerabilities within the security analytics system. For example, the security analytics system may use the graph database to identify a user with more security access than is necessary or appropriate for that user. In that example, a user may have super-user access to a server in an environment which the user is not employed to operate within. In another such example, the security analytics system may identify a user with revoked software security rights (e.g., an HR system has labeled the employee as fired and with revoked log-in credentials) that may still have physical security access rights to the building.

The security analytics system may analyze the security permission of each related object to determine the differences in the corresponding security permissions to identify potential security vulnerabilities. In some examples, the security analytics system may issue an alert or automatically initiate processes to suspend security permissions with respect to one or more objects that have a higher security permission grant than other related objects. In some example, the security analytics system may identify one or more objects that are missing security access permissions and initiate processes to update those objects to include security access permissions based on the security permissions of related objects. Thus, the security analytics system loads objects from disparate third-party systems and represents those objects in a universal and interoperable format.

Figure 1:
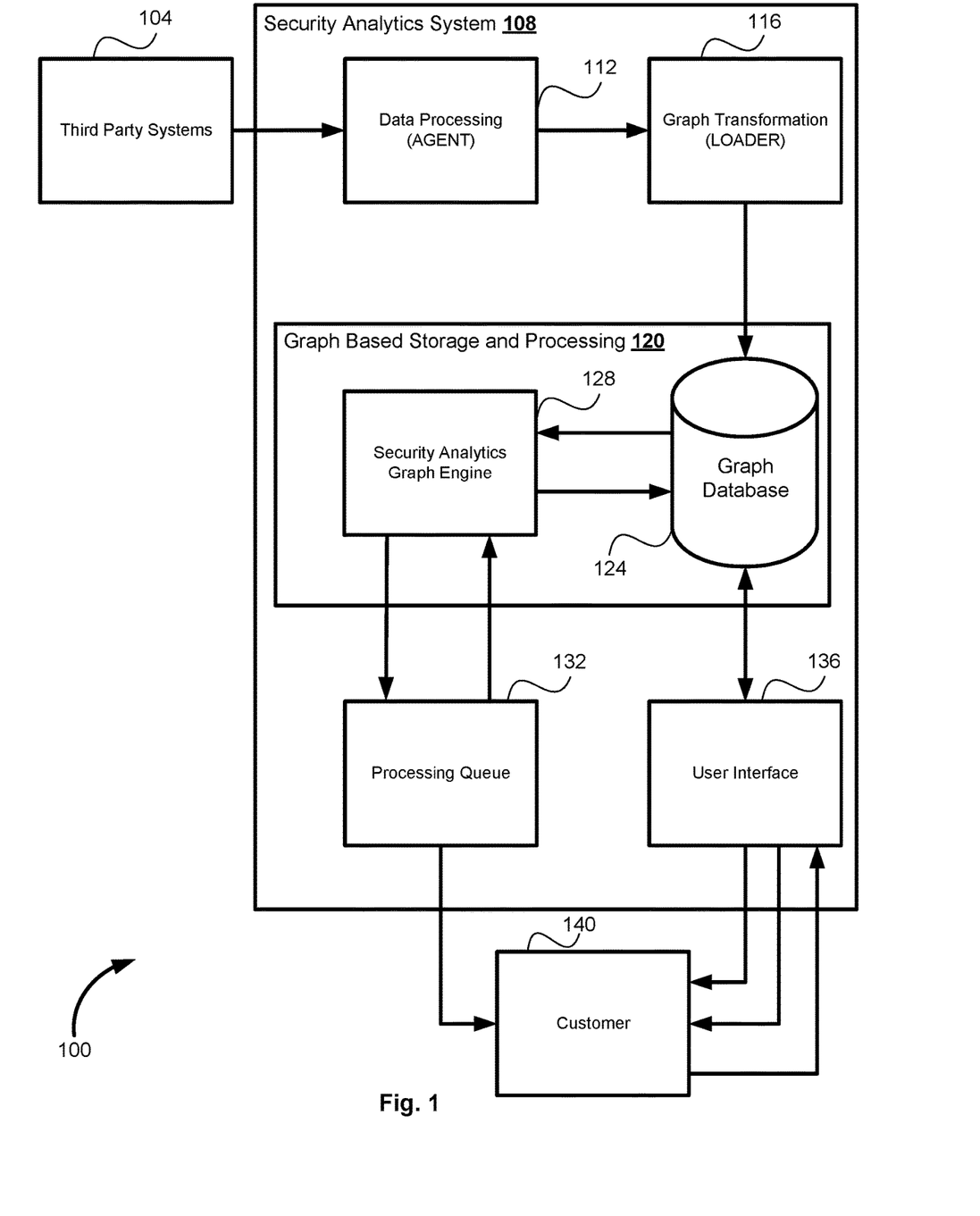
FIG. 1 depicts a block diagram of a security analytics system using graph databases according to an embodiment of the present invention.

FIG. 1 depicts a block diagram of a security analytics system including a graph database 100. The security and analytics system 108 connects to a one or more third party systems 104 to obtain, from each system, one or more objects. The third party systems 104 may include any system or subsystem including hardware and software systems and physical systems (such as physical security systems). For example, a third party system may include, but is not limited to, human resources (HR) systems, physical security systems such access control or surveillance, or software systems such as database, server, or applications. In some examples third party systems, can include any system, physical, virtual, logical, software, and/or the like, that is controlled by a separate entity from the security and analytics system 108.

Third party systems 104 may include one or more databases that store objects. For example, an HR system may store objects representing employees while a physical security system may store objects representing access rights to a door in a building. In some examples, the objects are represented in a format native to the type of database storing the object. For example, a relational database may store objects as a key followed by multiple values (e.g. a tuple) while in a document database the documents may be represented as objects. Since these objects are represented in different ways, it is not possible to identify the commonalities or differences between objects of different databases. This means objects from disparate databases cannot be compared, transfer data between them, and/or be interoperable. Incompatibility can be overcome using the security and analytics system 108 and the methods and systems described herein.

The security and analytics system 108 connects to the third party systems to capture the objects in each of the databases included therein. In some examples, the security and analytics system 108 interacts with the third party systems by directly accessing the data stored by the third party system, access data extracted from the third party system, or by external access to the third party system through an application user interface (UI). Once accessed, the data processing agent 112 may import the objects from the third party systems and transform the objects into a format usable by the loader 116. In some examples, data processing agent 112 transforms the objects by modifying the objects themselves. In other examples, data processing agent 112 transforms the objects by disassembling objects in to raw data and reassembling the raw data into new objects. The objects, once transformed, are represented in a generic or universal format.

Data processing agent 112 passes the transformed objects to the loader 116. Loader 116 processes the objects from data processing agent 112 and then converts the data to a graph database compliant format for graph database 124 of graph based storage and processing 120. Loader 116 then loads and merges the transformed objects into an abstract data model stored in the graph database 124. The graph database represents the objects within the abstract data model that abstracts from the way third-party systems store and control data. The abstracted data model of the graph database retains the structure and semantics of the objects, but represents objects generically such that the objects can be analyzed and processed reliably and consistently.

Security Analytics Graph Engine (SAGE) 128 can analyze data held within the graph database 124. SAGE 128 processes the object and data of the abstract data model and thus does not require particular knowledge of any of the third-party systems from which the data originated. The abstract data model enables SAGE 128 to identify relationships among the data objects regardless of the source of the objects.

Customers 140 may request one or more data objects and/or queries from the graph database 124 through SAGE 128. Customers send requests to the security and analytics system 108 through user interface 136. The user interface enables customers 140 to view data stored within graph database 124, manage the components of the security and analytics system, send alerts and notifications, and build and define metrics for use by the SAGE 128. Customers 140 may program metrics to obtain, view, and/or process one or more objects of graph database 124. Once programmed, metrics are deployed to the processing queue 132.

Processing queue 132 stores and controls the operation of SAGE 128. Upon receiving metrics from a customer, the processing queue 132 organizes the metrics and deploys them as necessary to SAGE 128. Processing queue 132 ensures the SAGE 128 processes metrics in a particular order and/or at the right time. In some examples, the processing queue enables SAGE 128 to process multiple metrics in a batch process (either in series or in parallel) to maximize the processing efficiency of SAGE 128. In other examples, processing queue 132 may schedule the metrics for execution in series or in parallel. In those examples, processing queue 132 may schedule metrics for consumption in-order or out-of-order based on the metric, the customer, SAGE, and/or the security and analytics system logic.

SAGE 128 consumes the metrics in order to process the requested objects or query and produce an output. In some examples, metrics represent a single query or request for data that is produced and output. In other examples, metrics represent a continuing process that identifies particular conditions present in the graph database and produces a continuous output. For example, a metric may identify a specific relationship between objects. If the relationships exists at any time after the metric is deployed, processing queue 132 may issue a notification to customer 140. In some examples, continuous metrics may include an expiration such that upon a predetermined time period the metric no longer produces an output and is purged from SAGE.

Figure 2:
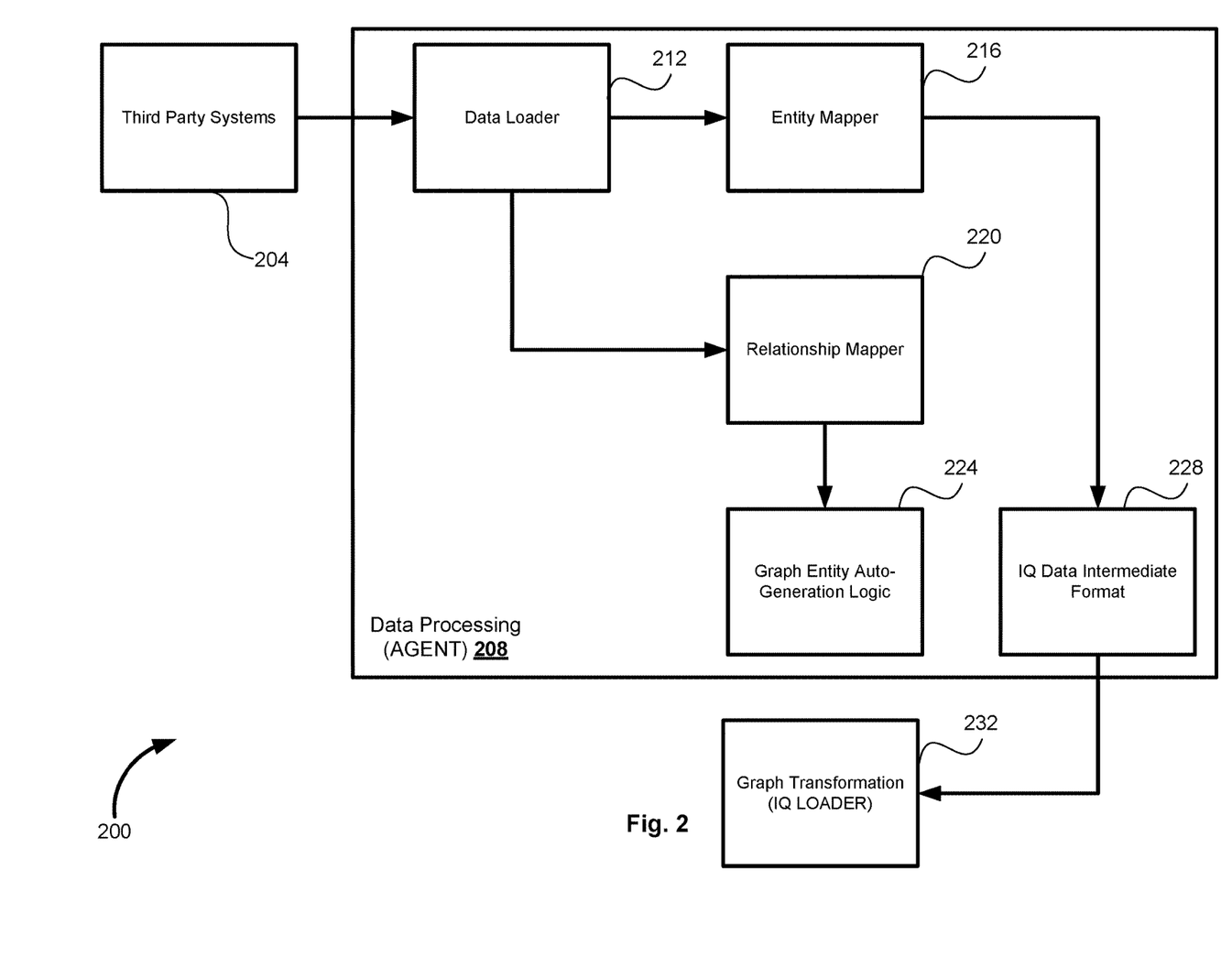
FIG. 2 depicts a block diagram of an agent system according to an embodiment of the present invention.

FIG. 2 depicts a block diagram 200 of an agent (such as data processing agent 112 of FIG. 1). Agent 208 receives objects (and data) from third-party systems 204 based on the type of system (e.g. format) the third-party system employs. In some examples, the system may query or otherwise detect the type of database and select an agent that may be configured to process objects from that particular database type. In other examples, agent 208 may be configured to process data from one or more different database types and thus be used regardless of the type of database. In still yet other examples, one or more agents may be organized in hierarchy of abstraction such that if a particular agent that is designed to process objects from a particular database is not available, the next best agent is selected. In that example, where an agent designed to process an Active Directory (which uses a form of a lightweight directory access protocol) may not be available, a generic agent designed to operate on lightweight directory access protocol objects may be selected. In those examples, the security and analytics system may start with an agent designed to process that system (or database) and move down the hierarchy of agents to a generic agent (with any number of agents in between). Agent 208 transfers the incoming objects to data loader 212. The data loader 212 converts objects to a format usable by the other components of agent 208. In some examples, data loader 212 transforms the objects into a generic or universal format by disassembling the objects into raw data and generating a new object in the universal format to store the raw data.

Entity mapper 216 processes the objects passed to it from data loader 212, identifying objects and representations that are to be imported into a graph database. As entity mapper 216 processes the objects, it builds the common object that will be imported to the graph database. Entity mapper 216 may identify the type of object being imported, identify if objects within the system are related to this object, determine the security level associated with the object, and/or store additional values against the object as required to support specific processes, metric processing, and/or assist with building graph data relationships. Data from this step is stored in a format called the 'IQ Data Intermediate Format,' which is processed later by a dedicated engine in the graph transformation (Loader) process.

As objects are processed, the relationship mapper 220 may identify links and relationships between objects. Relationship mapper 220 may then generate rules to define the relationship. In some examples, the rules include information about the object that the relationship links together and/or metadata that is specific to the relationship which is in addition to any data stored regarding the objects connected to the object. In some examples, the metadata may include data regarding a relationship type. For example, a relationship type may define objects associated with a same user. In some examples, the relationship type may describe a common security permission. In that example, all users associated with a particular permission, such as access to a physical door, may be related through a security relationship type. In other examples, any number of relationship types may exist and objects may be associated according to one or more relationships or relationship types. In those examples, a user object may have a first generic relationship type of employee that grants the user access to a building's front door and a second relationship type of software developer which grants the user access to a particular development environment.

As relationship mapper 220 defines relationships among objects it may determine that some of the relationships involve objects that are not available to the agent 208. For example, a third-party system may include an object in a first database designed to be related to a corresponding object in a second database that has not yet been created or has not yet been imported by agent 208. The relationship mapper may identify the first object and generate the data indicating the relationship with the then non-existent second object. In some examples, the data may be missing due to deletion, fraud, security breach or malware, a mistake, technical errors or faults, or the like. Graph entity auto-generation logic 224 may receive the object and relationship data and then define when it is necessary to generate missing objects, including what data to include in the data objects.

For example, a security object being analyzed may identify that a user object has a relationship to the security object. If the corresponding user object is missing, then graph entity auto-generation logic 224 may create a placeholder user object within the graph database so that this security object can be connected to a user object. In some examples, graph entity auto-generation logic 224 defines an empty place holder object that exists until the user object can be identified or loaded from a third-party system. In other examples, graph entity auto-generation logic 224 may use data identified in related objects to infer data regarding the placeholder object. In those objects, the inferred data is used to populate fields of the placeholder object. In some examples, if a placeholder object has all data fields populated with appropriate data it may not be necessary to acquire or load the real object from the third-party database. Instead, the placeholder object may become the missing object.

IQ data intermediate format 228 is defined by the engine (e.g., 316 of FIG. 3) within the graph transformation (loader) process. In some examples, IQ data intermediate format 228 is an intermediate format for incoming objects prior to the objects being processed and merged into the graph database. In those examples, IQ data intermediate format 228 may be a file formatted in the JavaScript Object Notation (JSON) format, with pre-configured objects and object relationship data stored within. The JSON file may be destined for a JSON-based engine which would import the objects and data to the graph database. Once the objects are in the IQ data intermediate format 228 the objects are passed to the loader 232.

Figure 3:
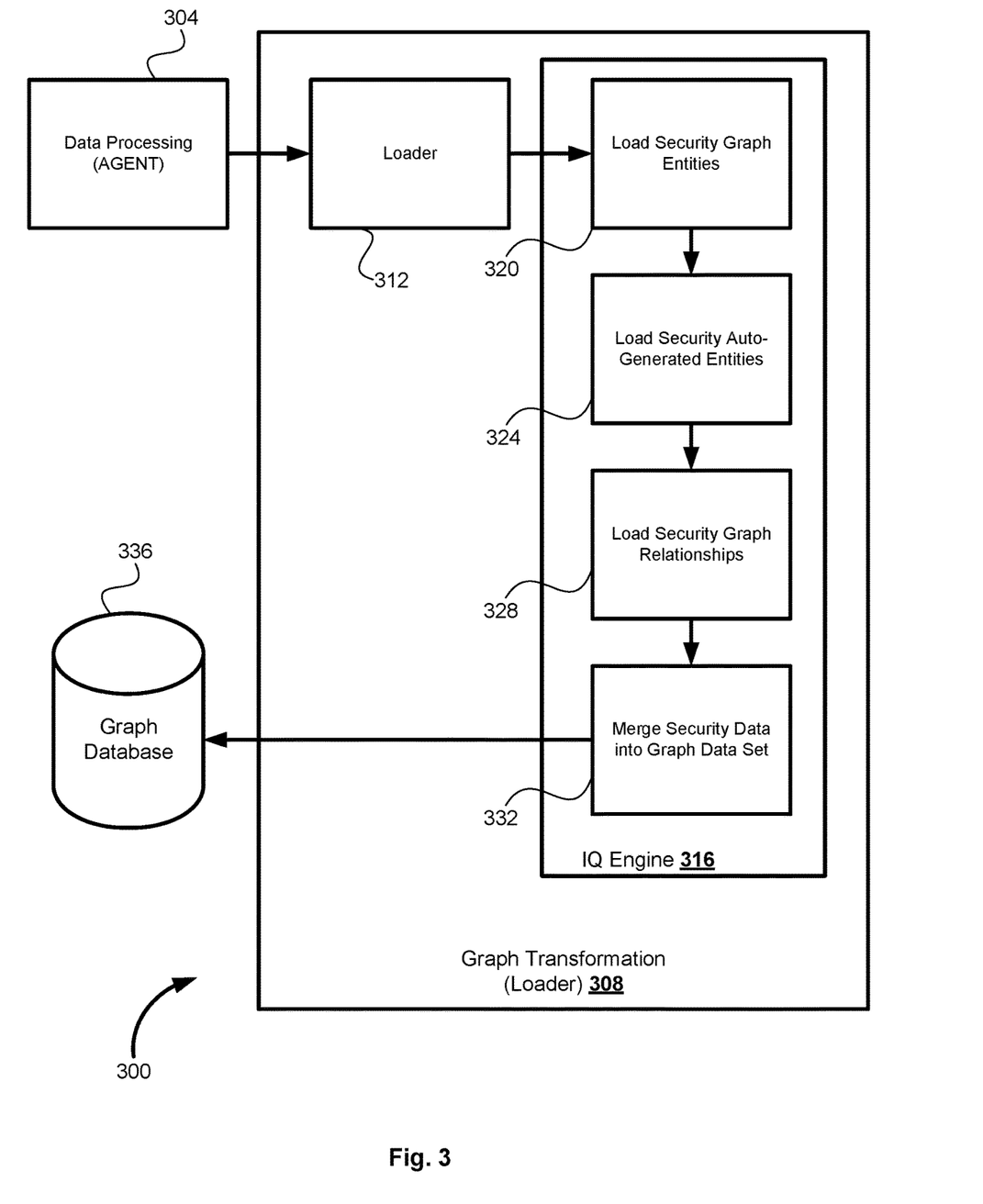
FIG. 3 depicts a block diagram of a graph transformation by a loader system according to an embodiment of the present invention.

FIG. 3 depicts a block diagram 300 of the graph transformation by a loader (e.g., 116 of FIG. 1). Upon receiving objects from agent 304, graph transformation (loader) 308 passes the common objects to loader 312. Loader 312 contains metadata that is presented to engine 316 to support the processing of data for one or more third-party systems. In some examples, a loader 312 may be programmed to process object and data from one, more than one, or all third-party systems from which object and data are received. The metadata allows a single engine to process data from many different systems.

Engine 316 may load data from objects in a common data format (e.g., the universal format), add customization values received from the loader 312, then merge and connect this data into existing data held within graph database 336. For example, security data from an Active Directory database may be imported and used to define relationships with objects from other systems (e.g., HR systems, databases, servers, other active directory systems, systems that interact with the active directory systems, and/or any other systems).

Engine 316 begins operations by loading security graph entities 320. At this step, loaded objects are analyzed to determine whether: (1) the objects are already present in the graph database 336; (2) the objects are valid (e.g., have required data fields, not corrupt, data fields have valid entries, and/or the like), and (3) whether an object implies a relationship to another object that is missing.

Operations continue by loading security auto-generated entities 324. Load security graph entities 320 identifies objects as they are loaded that have a relationship to one or more other objects. The loaded objects and relationship data are passed to loading security auto-generated entities 324 which identifies the location of the related objects. If the related object is located within the graph database 336 then no further processing is required and control passes to load security relationships. If the related object is not found or has not yet been loaded by loading security graph entities 320, then loading security auto-generated entities 324 generates a placeholder object to take the place of the related object. In some examples, the placeholder objects contain no data but merely exist in the system until the related object is loaded. At that time, the placeholder object is merged with the related object to preserve the relationship between the objects. In other examples, the placeholder object may be populated with data that can be identified based on the relationship between the loaded object and the related object. For example, a physical security object (e.g., an object granting access to a physical door) may have a relationship with a user object in an HR system that has not been loaded yet. In that example, a placeholder object may be generated for the user object. The placeholder object may include the name of the user object as obtained from the physical security object. Other such data may be identified based on the loaded object or the relationship between the loaded object and the related object. This data may also be included in the placeholder object.

Control then moves to load security graph relationships 328 where relationships between objects are defined with the appropriate information stored against the relationship as specified by the agent 304 and/or graph database 336. The relationship may define an ownership (e.g. an HR object of an user and physical security object that grants access rights to the user), a master/slave (e.g., an HR object for an employee and an HR object for a supervisor of the user), an association (e.g., two objects associated with a same security privilege, access right, system, server, database, software, or the like).

Control then shifts to merge security data into graph data set 332. Once the objects and relationships for a particular system are loaded and defined, relationships may be generated for different systems and among objects across systems, for example, the generation of a relationship between HR system data and an active directory system. In some embodiments, rules that define inter and intra system relationships for the objects are executed at once. In other embodiments, the rules are executed on a continuous or semi-continuous basis such that the relationship among objects may change dynamically over time. Once the objects are processed and all inter and intra relationships are defined, the objects are merged into the graph database 336.

Figure 4:
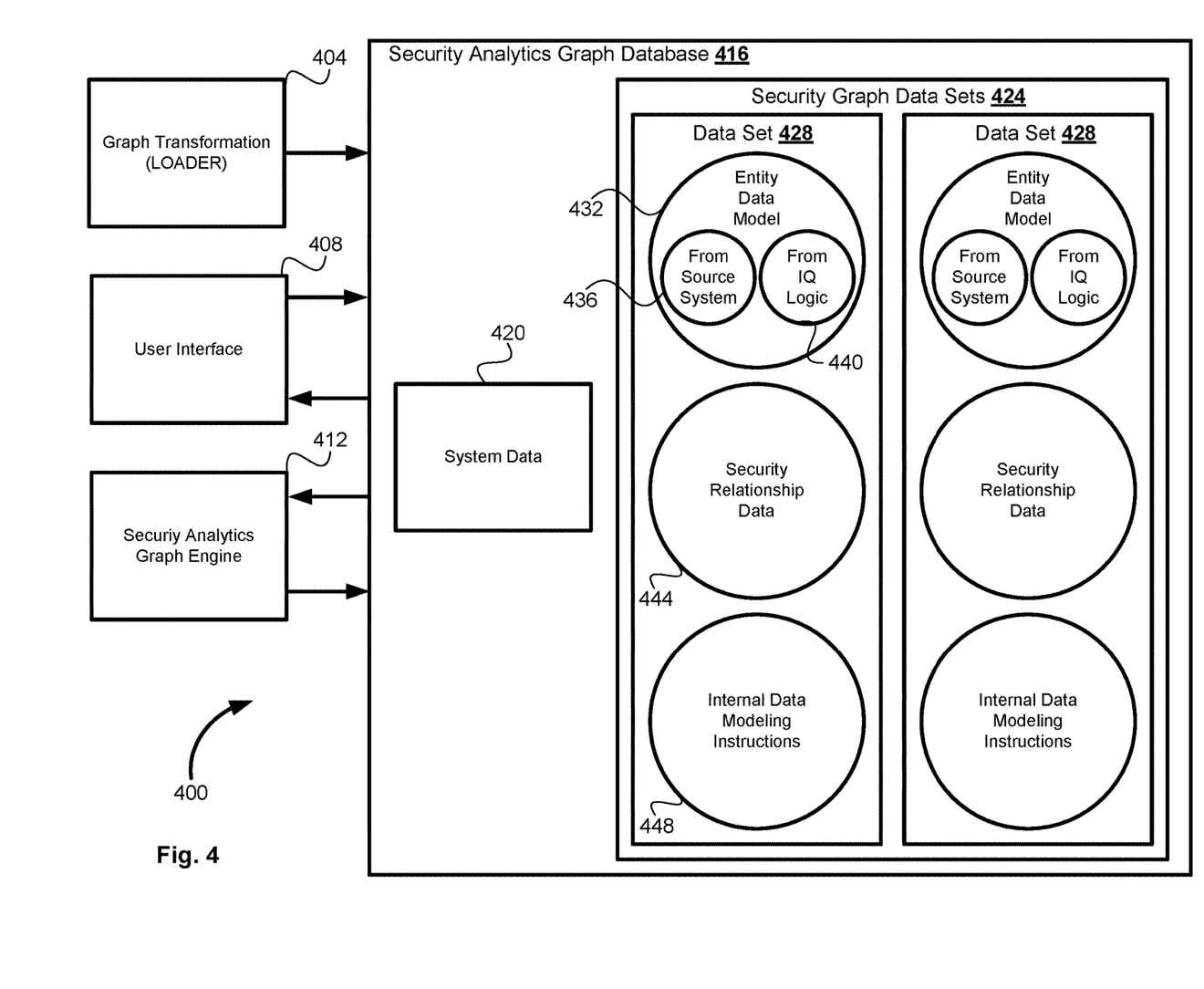
FIG. 4 depicts a block diagram of a graph database according to an embodiment of the present invention.

FIG. 4 depicts a block diagram 400 of a security analytics graph engine. Security analytics graph database 416 receives inputs from loader 404 (e.g. 116 of FIG. 1) user interface 408 (e.g., 136 of FIG. 1) and security analytics graph engine 412. Security analytics graph database includes system data 420 and security graph data sets 424. System data 420 includes system configuration data, user configuration data, operational product data, definitions of metrics, historical results from processed metrics, generic system data, and the like. Security graph data sets 424, includes a plurality of data sets 428 (although only two are depicted, security graph data sets 424 may include any number of data sets 428).

In some examples, each data set represents a snapshot of the objects of a single system. Thus, security graph data sets 424 may include a data set 428 for each connected third-party system. In other examples, each data set 428 represent a logical collection of objects and data received from one or more third-party systems. In these examples, objects and data are grouped into data sets by a logical and configurable rule base that can be modified at runtime.

Entity data model 432 represents a framework into which system data and objects can be represented. The entity data model 432 represents a plurality of objects as processed and loaded from a source system 436 and from logic (e.g., agent and loader) as well as the relationships between those objects. In some examples, the entity data model represents the objects in a directed (cyclic or acyclic) graph in which each object is represented with the connections to related objects. Objects may have zero, one, or more connections to other objects.

Data sets 428 additionally include security relationship data 444 and internal data modeling instructions 448. Security relationship data 444 includes security data for each object represented in the entity data model. In some examples, objects loaded from third-party systems include security permission data associated with a user. The security permissions may include a physical security permission, virtual (e.g., software access to a database) permission data, or the like. Security relationship data 444 captures the security permissions for each object and for groups of related objects.

In some examples, security relationship data 444 may identify an object of a group of related objects that has more or fewer security permissions than other related objects of the group. For example, a first object may include security permissions to a development database. A related second object may grant access to a door to enter a building. A related third object may grant access to a door to an accounting server. Security relationship data 444 may recognize the relationship between the first, second, and third objects and review the security permission data of each. In that example, security relationship data 444 may determine that although the third object grants access rights to the physical door of the accounting server, no object grants access rights to the accounting server itself. Thus, the security relationship data 444 may provide data for a determination that the user should not have access to the physical door of the account server and a notification to one or more users and/or access to the door may be automatically revoked as a result. Security relationship data 444 stores the associated security permissions of the object in the entity data model 432 which can be accessed by user interface 408 or security analytics graph engine 412.

Internal data modeling instructions 448 include software instructions and/or rules that control how the objects and relationships are organized by the entity data model 432. In some examples, the instructions include processing instructions that define how data may be represented by the entity data model 432. The data in the data sets 428 may be processed and/or analyzed in real-time by the security analytics graph engine 412. In some examples, the security analytics graph engine 412 automatically reports mismatching security permissions as soon as the mismatching objects appear in the data sets. In other examples, the data stored within the graph database is represented in an interactive graphical image via user interface 408 that represents a live image of the underlying data and in which a user could view and control mismatching security permissions.

Figure 5:
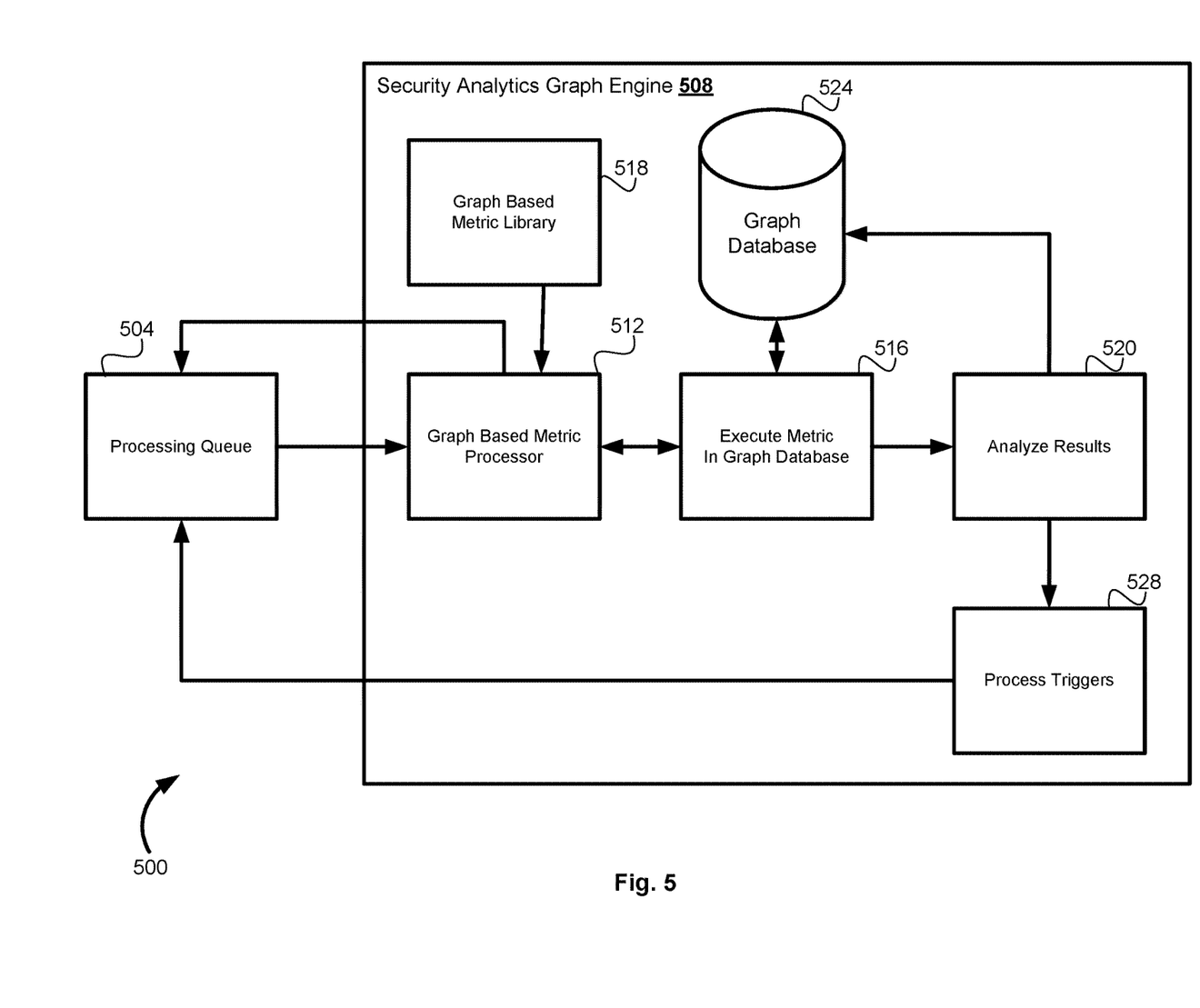
FIG. 5 depicts a block diagram of a security analytics graph engine (SAGE) according to an embodiment of the present invention.

FIG. 5 depicts a block diagram 500 of a processing via security analytics graph engine (SAGE) 508. Security analytics graph engine 508 (e.g., 412 of FIG. 4) receives jobs for processing via processing queue 504 (see FIG. 6 below). A job may include any request for processing or analyzing data of the graph database. For example, a job may include a definition of a metric which may then be executed on the data of the graph database to return an output. A job is deployed to the processing queue 504, and SAGE 508 processes the job. The output from processing the job is stored within the graph database and passed to processing queue 504. Once the results are returned to the processing queue 504 a notification may be issued indicating the job has terminated and the output may be displayed or otherwise transmitted to a user.

A job may be loaded by the graph based metric processor 512. In some examples, SAGE 508 may poll the job queue for available jobs to process. In other examples, the processing queue sends a notification and/or the job itself directly to SAGE for processing. Upon detecting an available job, SAGE may retrieve additional information associated with the job from the graph based metric library 518. Graph based metric library 518 contains templates and user configuration data which defines how SAGE 508 is to execute data analysis and/or the job.

Metrics are stored within graph based metric library 518. These metrics include metrics defined by users and/or SAGE 508. Graph based metric library 518 includes instructions received from a user that when executed determine how the metric is processed by SAGE 508. Graph based metric library 518 may also include metric templates. Metric templates may be used by a user to define new metrics. Each metric template may include a set of instructions and a set of requirements. The set of requirements indicate data that a user or SAGE 508 must include in order to define a valid template. Each template may have different requirements based on a type of the template. SAGE 508 may require both the metric template and metric data (provided by the user or internally obtained by SAGE 508) to process a metric.

Once the metric template and metric data have been extracted, the template and data are merged into a query executed on the graph database 524 via graph based metric library 518. Preliminary results of the query may be stored back into the graph database 524 and processing continues to the next phase. In block 520 the initial results of executing the query are analyzed. Here, one or more benchmarks may be applied to the initial results. If the benchmarks are satisfied then the formal output of the query may be stored in the graph database 524. If one or more of the benchmarks are not satisfied, the output may be re-executed in the graph database 524 and graph based metric library 516. In some examples, SAGE may use machine learning by modifying the initial query based on previously executed queries (and those results). The query may be continuously modified and re-executed until the benchmarks are satisfied.

Once the output satisfies the benchmarks, one or more triggers may be processed at 528. Triggers provide notifications and other data to processing queue 504. In some example, triggers may include notifications indicating a state of the object associated with query, the output of the query, the state of the graph database, and/or the like as a result of executing the query on the graph database. In other examples, a trigger may be processed for each iteration of a query, when a benchmark is not satisfied, when a threshold value is exceeded, and/or the like. Once the triggers have been processed and a result for the query has been obtained, the result of executing the query is output to the processing queue through graph based metric processor 512.

Figure 6:
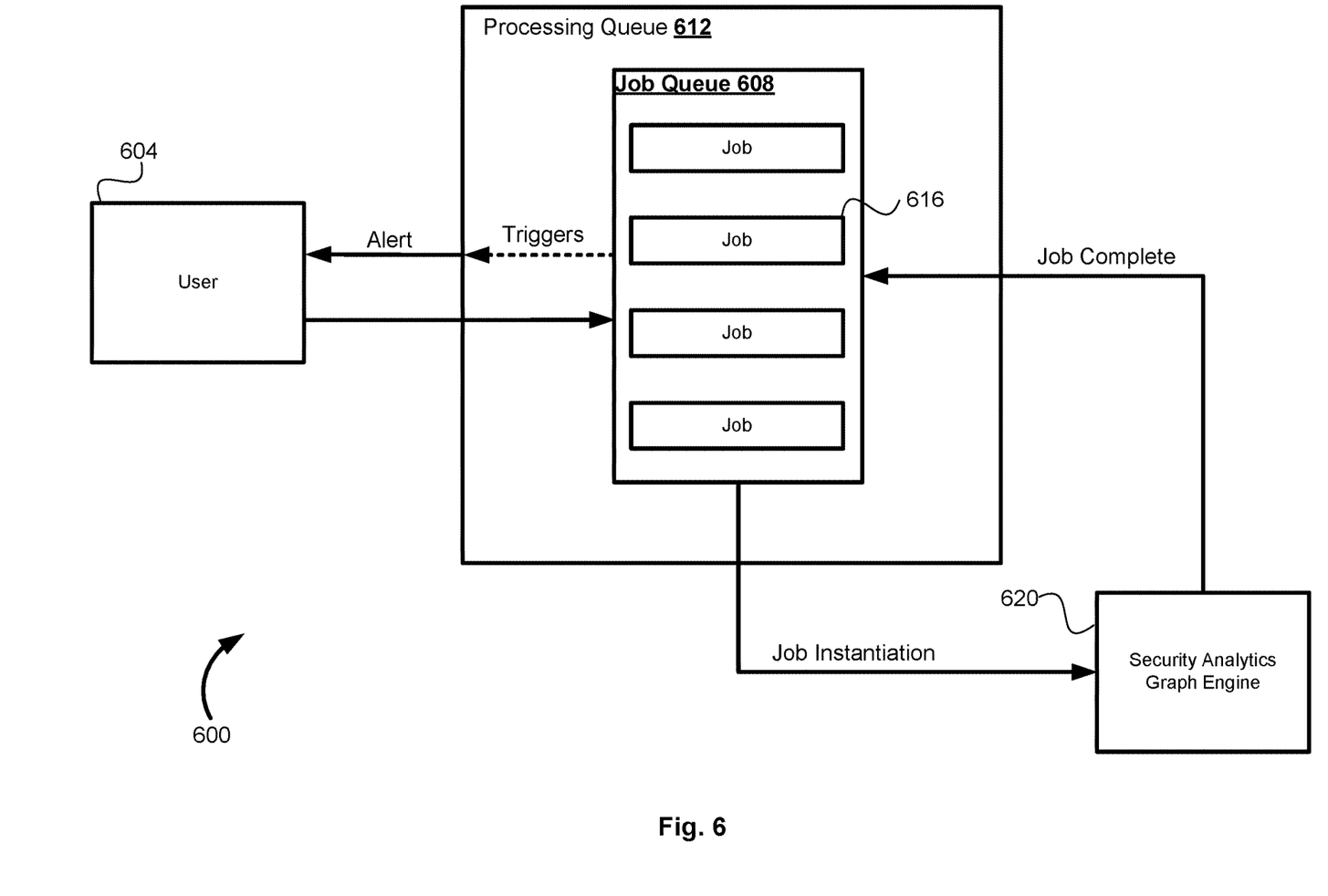
FIG. 6 depicts a block diagram of a processing queue utilized in conjunction with a security analytics graph engine (SAGE) according to an embodiment of the present invention.

FIG. 6 depicts a block diagram 600 of a processing queue. Processing queue 612 receives jobs from users 604 and/or third-party systems (not shown). Jobs 616 can be added to the job queue 608 by SAGE or by customers. Job queue 608 provides central communication for SAGE to process all the required activities in the system. In some examples, a plurality of job queues may operate concurrently. In those examples, the queues may operate within a parallel or distributed processing environment in which each queue includes dedicated processing resources. In some examples, each job queue may execute multiple instances of a SAGE executed in parallel to increase execution bandwidth.

Jobs may be scheduled for execution by SAGE 620 in any manner. In some examples, jobs are scheduled for execution in the order the jobs are received. In other examples, processing queue 612 includes logic that enables the processing queue to execute jobs out-of-order based on priority data received from a user, on the length of time a job is anticipated to execute such that jobs can be executed in a more timely or efficient manner, based on physical or virtual resource allocation, dependencies on objects and/or other jobs, and/or the like. A job 616 is instantiated and dispatched to SAGE 620 for execution and the results of which are returned to the job queue 608. Any triggers/alerts that occur as a result of processing the job are then transmitted to user 604.

Figure 7:
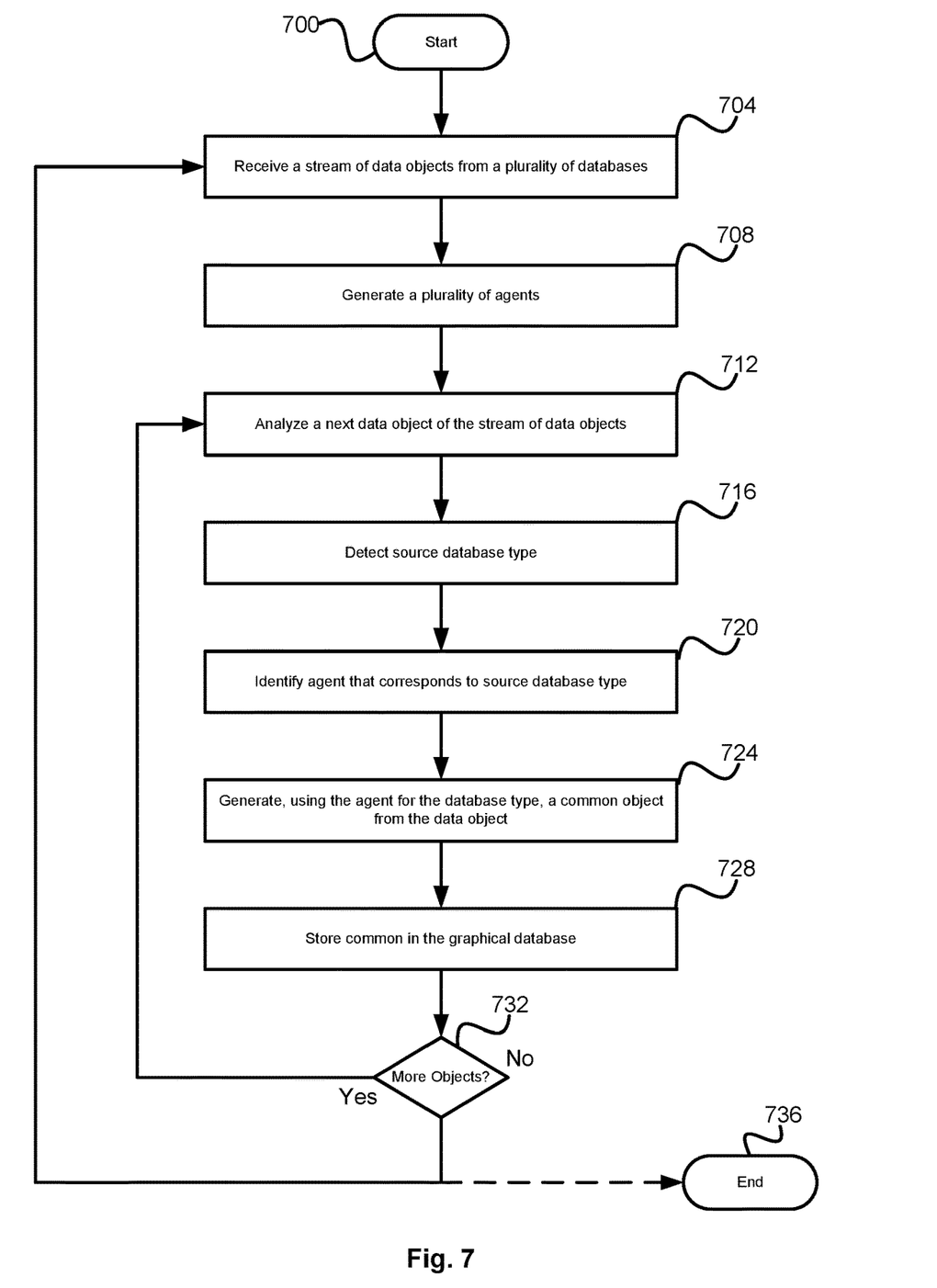
FIG. 7 illustrates a flowchart of an embodiment for generating common objects in a universal format according to an embodiment of the present invention.

FIG. 7 depicts a flowchart of a process 700 for generating common objects in a universal format. The process begins at block 704 in which a system loads a stream of data objects from one or more databases. The stream of data objects may represent a continuous input in which objects are added to the system as the objects are added to the databases. In some examples, the databases are part of one or more third party systems. In other examples, the plurality of databases are part of a single third party system. Each of the plurality of databases may store data in different formats based on its type of database. For example, a first database may be an Active Directory database which uses the lightweight directory access protocol (LDAP) and a second database may be a simple key-value database.

At block 708, the security analytics system generates a plurality of agents. Each agent is compatible with one or more database types. Agents analyze data within objects and are configured to generate common objects in a universal format. The process then moves to block 712 in which the security analytics system analyzes each data object. For each data object analyzed, the process continues at block 716 in which the security analytics system detects a database corresponding to the database that the object was loaded from (i.e. source database). In some examples, the source database may be determined from metadata within the object. In other examples, the source database may analyze the structure of the object to identify the structure and relationship of the data fields as well as the values stored within those fields. By analyzing the data structures and data values of an object, the security analytics system can determine the source database. At block 720, the security analytics system identifies an agent that corresponds to the source database type. In some examples, the agent is not pre-generated, but instead is generated dynamically upon detecting an object's particular source database type. In those examples, the security analytics systems identifies the source database type and may dynamically generate an agent corresponding to the database type.

At block 724, the identified agent is used to generate a common object in a universal format. In some examples, the agent may disassemble the object into raw data and generate a generic common object. The generic common object is then loaded with the raw data to form a duplicate of the original in the universal format. In other examples, the object may be transformed into a common object without needing to be disassembled first. In some examples, the common object is further processed to define relationships/connections with other objects, add data such as dependencies, security permissions, origin environment or database, ownership, or the like. In those examples, the common object may be processed along with other common objects to define relationships based on any data field or added data to the object. For example, the security analytics system may define a relationship between a first object and a second object based on a security permission, user, data value, field, environment, software, dependencies, hardware platform, or the like. Once the common object has been generated, the common object is stored in a graph database at block 728 and control passes to 732. At 732, it is determined whether there are any more objects that have not been processed into common objects. If there are more data objects remaining, then the process returns to block 712 to process a next data object.

If there are no data objects remaining, control can return to block 704 where additional streams of objects are received for one or more databases. The stream of data objects may be received continuously and thus the process of 704-732 may repeat indefinitely or for such a time as the input stream includes objects that can be processed. In some examples, the system receives a notification of an impending stream. For example, the process may temporarily terminate at 736 when all objects of the stream have been processed and restart at block 704 upon receiving a notification that a new stream of objects has been established. In other examples, the process may optionally terminate. For example, if all streams of data objects have been processed (and no additional streams of data objects are expected), the process may terminate.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps and means described above may be done in various ways. For example, these techniques, blocks, steps and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above, and/or a combination thereof.

Also, it is noted that the embodiments may be described as a process which is depicted as a flowchart, a flow diagram, a swim diagram, a data flow diagram, a structure diagram, or a block diagram. Although a depiction may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages, and/or any combination thereof. When implemented in software, firmware, middleware, scripting language, and/or microcode, the program code or code segments to perform the necessary tasks may be stored in a machine readable medium such as a storage medium. A code segment or machine-executable instruction may represent a procedure, a function, a subprogram, a program, a routine, a subroutine, a module, a software package, a script, a class, or any combination of instructions, data structures, and/or program statements. A code segment may be coupled to another code segment or a hardware circuit by passing and/or receiving information, data, arguments, parameters, and/or memory contents. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more memories for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to, portable or fixed storage devices, optical storage devices, and/or various other storage mediums capable of storing that contain or carry instruction(s) and/or data.

While the principles of the disclosure have been described above in connection with specific apparatuses and methods, it is to be clearly understood that this description is made only by way of example and not as limitation on the scope of the disclosure.

What is claimed is:

1. A method of generating common objects in a universal format, the method comprising:
receiving a stream of data objects from each of a plurality of source systems, wherein at least one source system of the plurality of source systems stores data objects in a different format than other source systems of the plurality of source systems;
generating a plurality of agents, each agent of the plurality of agents being configured to process data objects that are received from a source system that conforms to a particular system type;
for each data object of the stream of data objects and from each source system of the plurality of source systems:
detecting a particular source system of the plurality of source systems that corresponds to the data object, the particular source system storing data objects in a particular format based on a system type of the particular source system;
selecting a particular agent of the plurality of agents based on the system type of the particular source system, the particular agent configured to process data objects represented in the particular format of the particular source system of the data object;
generating, by the particular agent and based on the data object represented in the particular format of the particular source system of the data object, a common object in the universal format; and
storing the common object in a graph system;
identifying a first relationship between a first data object from a first source system of the plurality of source systems and a user data object from a second source system of the plurality of source systems based on information obtained from the first data object about the user data object; and
defining a second relationship between a first common object in the universal format generated from the first data object and the user data object.

2. A system that generates common objects in a universal format, the system comprising:
one or more processors;
a graph system;
a non-transitory computer-readable storage media comprising instructions, which, when executed by the one or more processors, cause the one or more processors to perform operations including:
receiving a stream of data objects from each of a plurality of source systems, wherein at least one source system of the plurality of source systems stores data objects in a different format than other source systems of the plurality of source systems;
generating a plurality of agents, each agent of the plurality of agents being configured to process data objects that are received from a source system that conforms to a particular system type;
for each data object of the stream of data objects and from each source system of the plurality of source systems:
detecting a particular source system of the plurality of source systems that corresponds to the data object, the particular source system storing data objects in a particular format based on a system type of the particular source system;
selecting a particular agent of the plurality of agents based on the system type of the particular source system, the particular agent configured to process data objects represented in the particular format of the particular source system of the data object;
generating, by the particular agent and based on the data object represented in the particular format of the particular source system of the data object, a common object in the universal format; and
storing the common object in the graph system;
identifying a first relationship between a first data object from a first source system of the plurality of source systems and a user data object from a second source system of the plurality of source systems based on information obtained from the first data object about the user data object; and
defining a second relationship between a first common object in the universal format generated from the first data object and the user data object.

3. A non-transitory computer-readable storage medium comprising instructions for generating common objects in a universal format, transitory computer-readable storage medium storing instructions, which, when executed by one or more processors, cause the one or more processors to perform operations including:
receiving a stream of data objects from each of a plurality of source systems, wherein at least one source system of the plurality of source systems stores data objects in a different format than other source systems of the plurality of source systems;
generating a plurality of agents, each agent of the plurality of agents being configured to process data objects that are received from a source system that conforms to a particular system type;
for each data object of the stream of data objects and from each source system of the plurality of source systems:
detecting a particular source system of the plurality of source systems that corresponds to the data object, the particular source system storing data objects in a particular format based on a system type of the particular source system;
selecting a particular agent of the plurality of agents based on the system type of the particular source system, the particular agent configured to process data objects represented in the particular format of the particular source system of the data object;
generating, by the particular agent and based on the data object represented in the particular format of the particular source system of the data object, a common object in the universal format; and
storing the common object in a graph system;
identifying a first relationship between a first data object from a first source system of the plurality of source systems and a user data object from a second source system of the plurality of source systems based on information obtained from the first data object about the user data object; and
defining a second relationship between a first common object in the universal format generated from the first data object and the user data object.

4. The method of claim 1, wherein the particular source system of the plurality of source systems includes an active directory system and a second source system of the plurality of source systems includes a relational system.

5. The method of claim 1, wherein each common object includes a security permission.

6. The method of claim 1, further comprising:
receiving input of a selection of an attribute;
identifying two or more common objects that are associated with the attribute; and
generating a graphical user interface representing each of the two or more common objects based on the attribute.

7. The system of claim 2, wherein the particular source system of the plurality of source systems includes an active directory system and a second source system of the plurality of source systems includes a relational system.

8. The system of claim 2, wherein each common object includes a security permission.

9. The system of claim 2, further comprising:
receiving input of a selection of an attribute;
identifying two or more common objects that include the attribute; and
generating a graphical user interface representing each of the two or more common objects based on the attribute.

10. The non-transitory computer-readable storage medium of claim 3, wherein the particular source system of the plurality of source systems includes an active directory system and a second source system of the plurality of source systems includes a relational system.

11. The non-transitory computer-readable storage medium of claim 3, wherein each common object includes a security permission.

12. The non-transitory computer-readable storage medium of claim 3, further comprising:
receiving input of a selection of an attribute;
identifying two or more common objects that include the attribute; and
generating a graphical user interface representing each of the two or more common objects based on the attribute.

13. The method of claim 5, wherein the security permission grants a user access to one of: a physical security system, a software security system, a system, or a server.

14. The method of claim 5, wherein the security permission grants a user access to a physical door of a building.

15. The system of claim 8, wherein the security permission grants a user access to one of: a physical security system, a software security system, a system, or a server.

16. The non-transitory computer-readable storage medium of claim 11, wherein the security permission grants a user access to a physical security system, wherein the physical security system includes a door that requires authorization to open.

17. The method of claim 13, wherein the physical security system includes a door that requires authorization to open.

18. The method of claim 1, further comprising:
determining that a second common object corresponding to the user data object does not exist in the graph system;
generating, in response to determining that the second common object does not exist in the graph system, a placeholder common object in the universal format for the user data object;
populating the placeholder common object with the information obtained from the first data object about the user data object; and
storing the placeholder common object in the graph system.

19. The system of claim 15, wherein the physical security system includes a door that requires authorization to open.

20. The method of claim 18, further comprising:
generating, after storing the placeholder common object in the graph system, the second common object in the universal format from the user data object; and
merging the second common object in the universal format with the placeholder common object in the universal format in the graph system.

* * * * *